United States Patent
Kamoshida et al.

(10) Patent No.: US 9,404,680 B2
(45) Date of Patent: Aug. 2, 2016

(54) EVAPORATOR WITH COOL STORAGE FUNCTION

(71) Applicant: KEIHIN THERMAL TECHNOLOGY CORPORATION, Oyama-shi (JP)

(72) Inventors: Osamu Kamoshida, Oyama (JP); Takashi Hirayama, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 198 days.

(21) Appl. No.: 14/140,521

(22) Filed: Dec. 25, 2013

(65) Prior Publication Data
US 2014/0182330 A1    Jul. 3, 2014

(30) Foreign Application Priority Data
Dec. 27, 2012   (JP) .................................. 2012-283875

(51) Int. Cl.
| | |
|---|---|
| F25B 39/02 | (2006.01) |
| F28F 1/00 | (2006.01) |
| F25D 21/14 | (2006.01) |
| F28B 9/08 | (2006.01) |
| F28F 1/02 | (2006.01) |
| F28F 1/08 | (2006.01) |
| F28F 17/00 | (2006.01) |
| F28F 1/06 | (2006.01) |

(52) U.S. Cl.
CPC ............... *F25B 39/022* (2013.01); *F25B 39/02* (2013.01); *F25B 2400/24* (2013.01); *F25D 21/14* (2013.01); *F28B 9/08* (2013.01); *F28F 1/006* (2013.01); *F28F 1/025* (2013.01); *F28F 1/06* (2013.01); *F28F 1/08* (2013.01); *F28F 17/005* (2013.01); *F28F 2001/027* (2013.01)

(58) Field of Classification Search
CPC ..... F25B 39/022; F25B 2400/24; F25B 39/02; F25D 21/14; F28B 9/08; F28F 17/005; F28F 1/006; F28F 2001/027; F28F 1/025; F28F 1/06; F28F 1/08
USPC ............................................. 62/524; 165/177
See application file for complete search history.

(56) References Cited

U.S. PATENT DOCUMENTS

| | | | | |
|---|---|---|---|---|
| 2003/0029608 | A1* | 2/2003 | Shimoya | ............... F28D 1/0316 165/152 |
| 2010/0307180 | A1* | 12/2010 | Yamada | .................. F25D 19/00 62/285 |
| 2011/0239696 | A1* | 10/2011 | Takagi | ............... B60H 1/00335 62/524 |

FOREIGN PATENT DOCUMENTS

| | | | |
|---|---|---|---|
| JP | 2003042586 A | * | 2/2003 |
| JP | 2010-149814 | | 7/2010 |

*Primary Examiner* — Frantz Jules
*Assistant Examiner* — Steve Tanenbaum
(74) *Attorney, Agent, or Firm* — Mori & Ward, LLP

(57) ABSTRACT

An evaporator with a cool storage function includes a plurality of flat refrigerant flow tubes and at least one cool storage material container. The at least one cool storage material container includes a container main body and a plurality of convex portions. The container main body has a first wall and a second wall opposite to the first wall which are substantially parallel to a plane including a longitudinal direction and a width direction. The first wall and the second wall are connected to adjacent refrigerant flow tubes among the plurality of refrigerant flow tubes, respectively. The plurality of convex portions are provided on the first wall and the second wall to protrude outwardly from the first wall and the second wall. Two adjacent convex portions among the plurality of convex portions form each of condensed water drain passages therebetween.

18 Claims, 8 Drawing Sheets

EVAPORATOR WITH COOL STORAGE FUNCTION

CROSS-REFERENCE TO RELATED APPLICATIONS

The present application claims priority under 35 U.S.C. §119 to Japanese Patent Application No. 2012-283875, filed Dec. 27, 2012. The contents of this application are incorporated herein by reference in their entirety.

BACKGROUND OF THE INVENTION

1. Field of the Invention

The present invention relates to an evaporator with a cool storage function.

2. Discussion of the Background

In recent years, in order to protect the environment and improve fuel consumption of automobiles, there has been proposed an automobile designed to automatically stop the engine when the automobile stops, for example, to wait for a traffic light to change.

However, an ordinary car air conditioner has a problem in that, when an engine of an automobile in which the air conditioner is mounted is stopped, a compressor driven by the engine is stopped, and supply of refrigerant to an evaporator stops, whereby the cooling capacity of the air conditioner drops sharply.

As one measure to solve such a problem, imparting a cool storage function to the evaporator has been considered, to thereby enable cooling of a vehicle compartment by releasing the cool stored in the evaporator, when the compressor stops as a result of stoppage of the engine.

The present applicant has proposed an evaporator with a cool storage function (see Japanese Patent Application Laid-Open (kokai) No. 2010-149814). In the proposed evaporator, a plurality of tube sets each including two flat refrigerant flow tubes whose longitudinal direction coincides with the vertical direction, whose width direction coincides with an air-passing direction, and which are spaced from each other in the air-passing direction are disposed in parallel such that the tube sets are spaced from one another in the thickness direction of the refrigerant flow tubes so as to form clearances each provided between adjacent tube sets. Cool storage material containers containing a cool storage material are disposed in some of the clearances such that each cool storage material container extends across all the refrigerant flow tubes of the corresponding tube sets. Each cool storage material container has a container main body portion joined to the corresponding refrigerant flow tubes. A plurality of convex portion rows are disposed on each of the left and right side walls of the container main body portion of each cool storage material container such that convex portion rows are spaced from one another in the air-passing direction. Each convex portion row includes a plurality of convex portions which are formed on the left or right side wall such that they are spaced from one another in the vertical direction, which protrude outward, and which are in contact with the corresponding refrigerant flow tube. The length of each convex portion is smaller than the width of the cool storage material container as measured in the air-passing direction, and each convex portion slopes toward to the windward side from the upper end toward the lower end thereof.

SUMMARY OF THE INVENTION

According to one aspect of the present invention, an evaporator with a cool storage function includes a plurality of flat refrigerant flow tubes, outer fins, and at least one cool storage material container. The plurality of flat refrigerant flow tubes have a longitudinal direction and a width direction which is perpendicular to the longitudinal direction and along which air is to pass. The plurality of flat refrigerant flow tubes are disposed in parallel and spaced apart from one another in a thickness direction of the plurality of refrigerant flow tubes to form spaces among the plurality of flat refrigerant flow tubes. The thickness direction is perpendicular to the longitudinal direction and the width direction. The outer fins are disposed in a first part of the spaces and joined to the plurality of refrigerant flow tubes. The at least one cool storage material container contains a cool storage material and is disposed in a second part of the spaces other than the first part. The at least one cool storage material container includes a container main body, condensed water drain passages, and a plurality of convex portions. The container main body has a first wall and a second wall opposite to the first wall which are substantially parallel to a plane including the longitudinal direction and the width direction. The first wall and the second wall are connected to adjacent refrigerant flow tubes among the plurality of refrigerant flow tubes, respectively. The condensed water drain passages are provided on outer surfaces of the first wall and the second wall. The plurality of convex portions are provided on the first wall and the second wall to protrude outwardly from the first wall and the second wall. Two adjacent convex portions among the plurality of convex portions form each of the condensed water drain passages therebetween. The condensed water drain passage extends in an extending direction from a first opening to a second opening obliquely with respect to the longitudinal direction. At least one of the two adjacent convex portions have a length in the extending direction greater than a width of the container main body in the width direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

An embodiment of the present invention will next be described with reference to the drawings.

Figure 2:
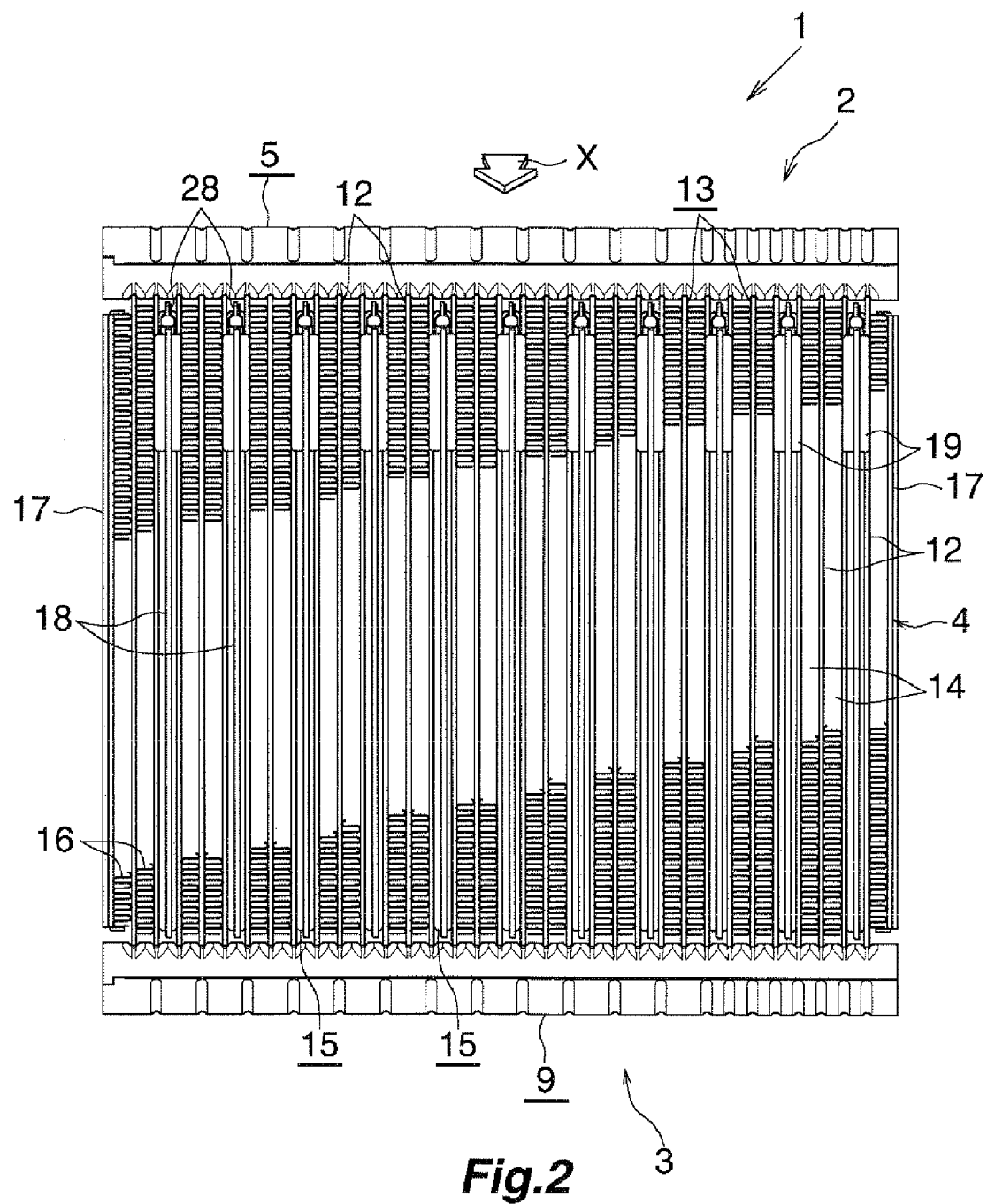
FIG. 2 is a front view showing the overall structure of the evaporator with a cool storage function according to an embodiment of the present invention as viewed from the downstream side in an air-passing direction.

In the present specification, the upper, lower, left-hand, and right-hand sides of FIG. 2 will be referred to as "upper," "lower," "left," and "right," respectively.

Figure 3:
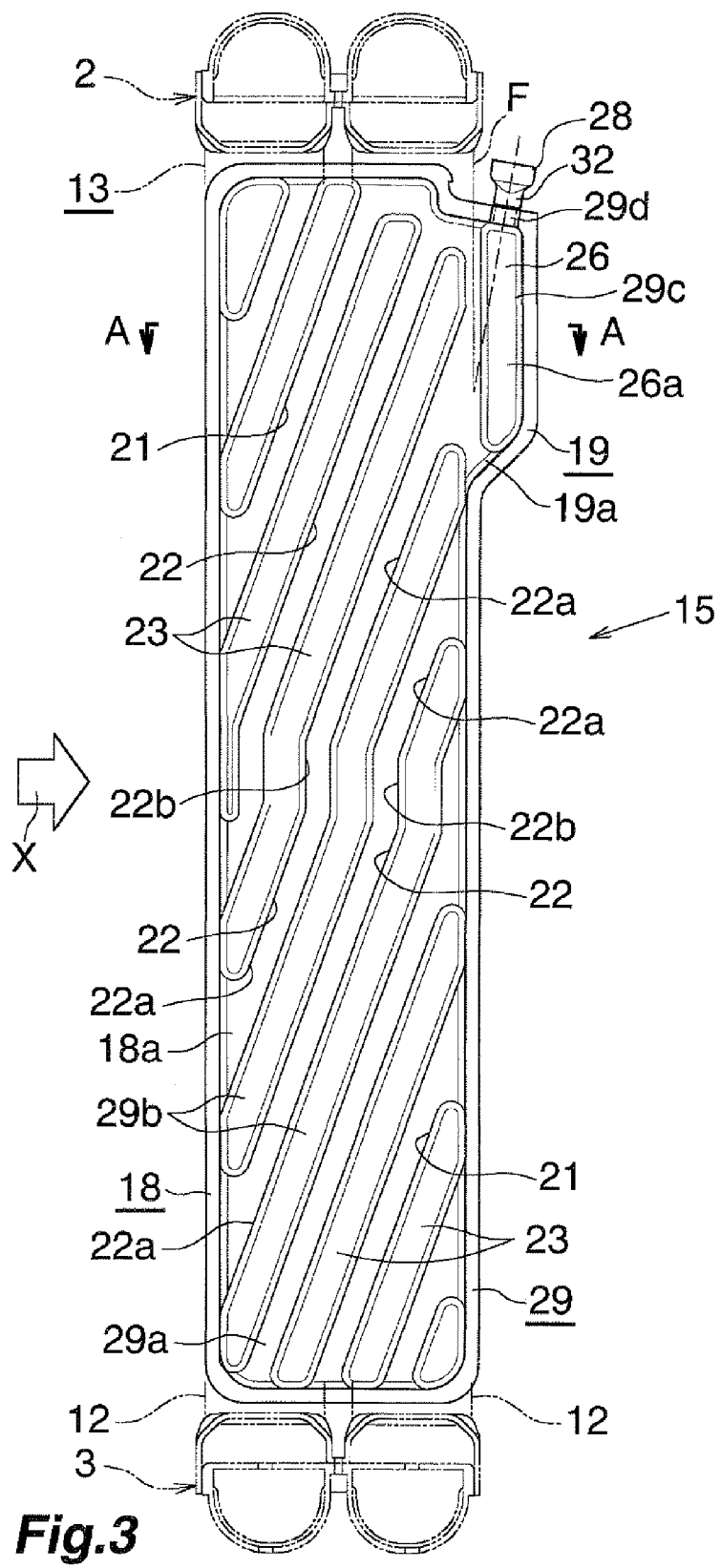
FIG. 3 is a left side view of a cool storage material container used in the evaporator with a cool storage function in FIGS. 1 and 2.
Figure 4:
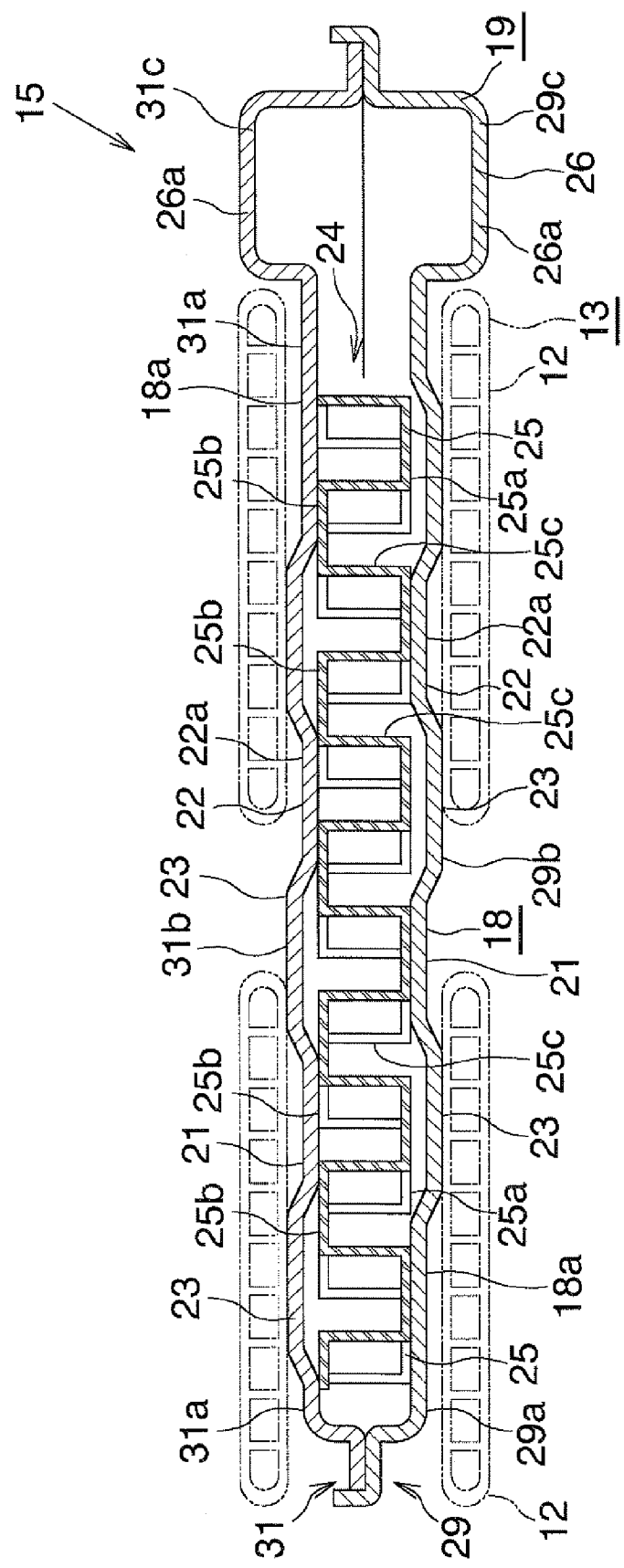
FIG. 4 is an enlarged sectional view taken along line A-A in FIG. 3.
Figure 5:
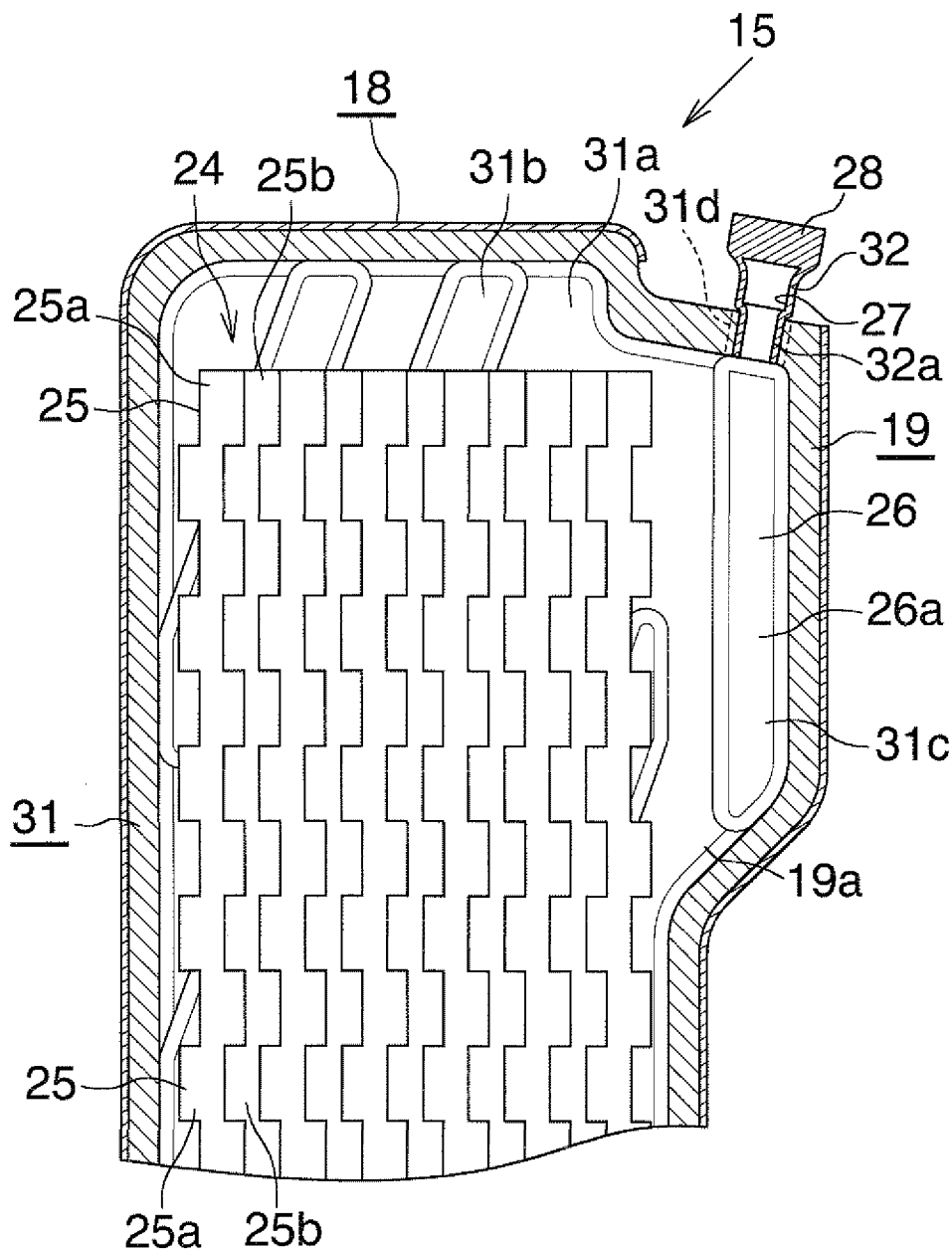
FIG. 5 is a view corresponding to a portion in FIG. 3 and showing an upper portion of a cool storage material container used in the evaporator with a cool storage function in FIGS. 1 and 2, with a metal plate on the left side being cut and removed.

In the following description, the downstream side with respect to an air-passing direction (a direction represented by arrow X in FIGS. 1 through 3) will be referred to as the "front," and the opposite side as the "rear." Accordingly, the upper, lower, left-hand, and right-hand sides of an evaporator as viewed rearward from the front side correspond to the upper, lower, left-hand, and right-hand sides of FIG. 2.

Furthermore, the term "aluminum" as used in the following description encompasses aluminum alloys in addition to pure aluminum.

Figure 1:
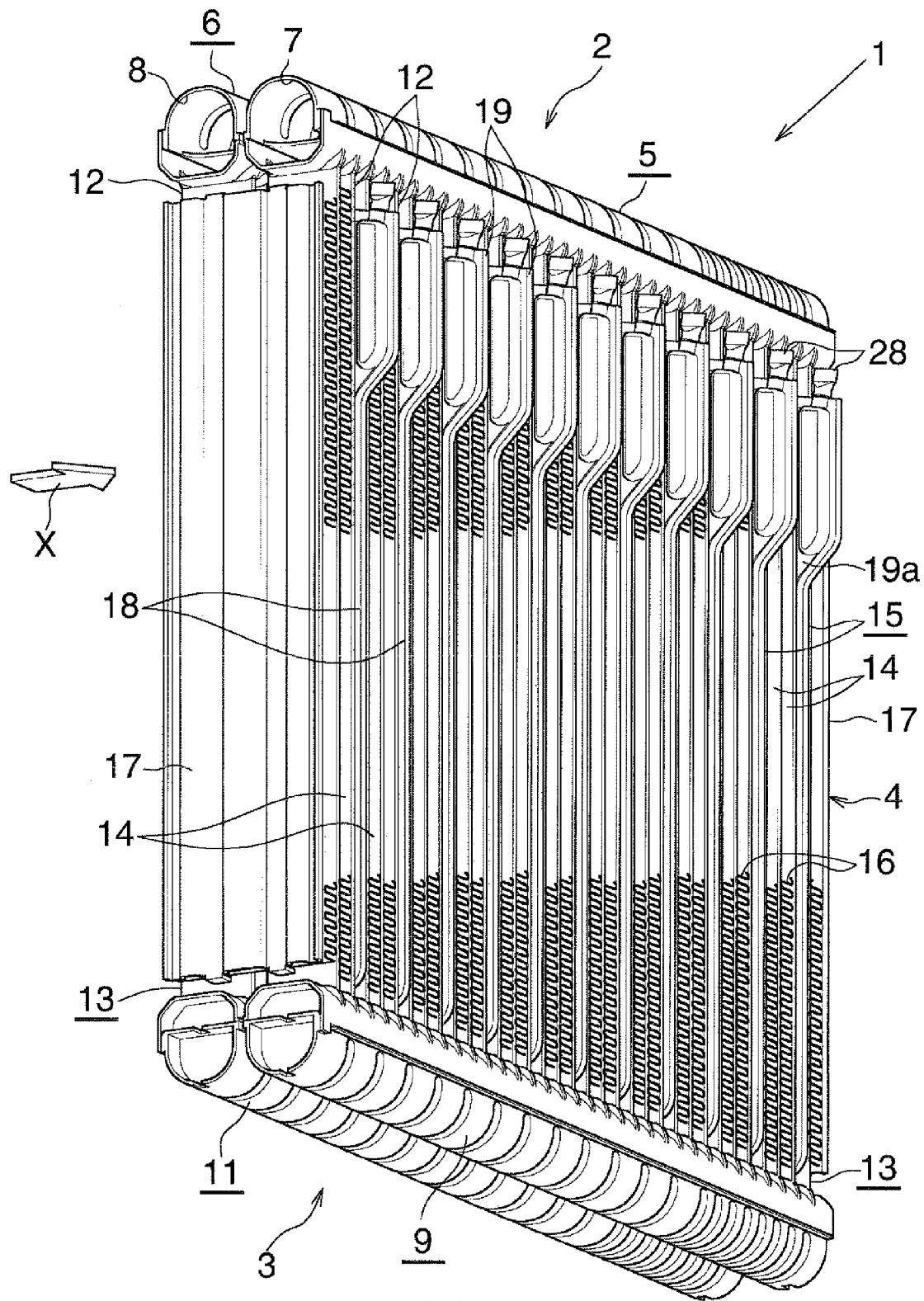
FIG. 1 is a perspective view showing the overall structure of an evaporator with a cool storage function according to an embodiment of the present invention.

FIGS. 1 and 2 show the overall configuration of an evaporator with a cool storage function according to the embodiment of the present invention, and FIGS. 3 to 7 show the configuration of an essential portion of the evaporator.

As shown in FIGS. 1 and 2, an evaporator with a cool storage function 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the left end of the leeward upper header section 5, and a refrigerant outlet 8 is provided at the left end of the windward upper header section 6. The second header tank 3 includes a leeward lower header section 9 located on the front side, and a windward lower header section 11 located on the rear side and united with the leeward lower header section 9.

In the heat exchange core section 4, a plurality of flat refrigerant flow tubes 12 which extend in the vertical direction, whose width direction coincides with the air-passing direction (the front-rear direction), and which are formed of aluminum extrudate are disposed in parallel such that they are spaced from one another in the left-right direction (the thickness direction of the refrigerant flow tubes 12). In the present embodiment, a plurality of pairs 13 each composed of two refrigerant flow tubes 12 spaced from each other in the front-rear direction are disposed at predetermined intervals in the left-right direction. A clearance 14 is formed between adjacent two of the pairs 13 each composed of the front and rear refrigerant flow tubes 12. An upper end portion of each front refrigerant flow tube 12 is connected to the leeward upper header section 5, and a lower end portion of each front refrigerant flow tube 12 is connected to the leeward lower header section 9. Similarly, an upper end portion of each rear refrigerant flow tube 12 is connected to the windward upper header section 6, and a lower end portion of each rear refrigerant flow tube 12 is connected to the windward lower header section 11.

A cool storage material container 15 which is formed of aluminum and which contains a cool storage material (not shown) is disposed in each of clearances 14 selected from all the clearances 14 of the heat exchange core section 4, the selected clearances 14 being not adjacent from one another, such that the cool storage material container 15 extends over the front and rear refrigerant flow tubes 12. Also, a corrugated outer fin 16 is disposed in each of the remaining clearances 14 such that the corrugated outer fin 16 extends over the front and rear refrigerant flow tubes 12, and is brazed to the front and rear refrigerant flow tubes 12 of the left-side and right-side pairs 13 which define the clearance 14. The corrugated outer fin 16 is formed from an aluminum brazing sheet having a brazing material layer on each of opposite surfaces thereof and has crest portions extending in the front-rear direction, trough portions extending in the front-rear direction, and connection portions connecting the crest portions and the trough portions. In the present embodiment, one outer fin 16 is disposed in each of the clearances 14 adjacently located on the left and right sides of the clearance 14 in which the cool storage material container 15 is disposed, and two outer fins 16 are disposed between the cool storage material containers 15 located adjacent to each other in the left-right direction. Notably, three or more outer fins 16 may be disposed between the cool storage material containers 15 located adjacent to each other in the left-right direction. Also, the outer fin 16, which is formed from an aluminum brazing sheet having a brazing material layer on each of opposite surfaces thereof, is disposed on the outer side of the pair 13 of the refrigerant flow tubes 12 located at the left end, and is disposed on the outer side of the pair 13 of the refrigerant flow tubes 12 located at the right end. These outer fins 16 are brazed to the corresponding front and rear refrigerant flow tubes 12. Furthermore, a side plate 17 formed of aluminum is disposed on the outer side of each of the outer fins 16 located at the left and right ends, respectively, and is brazed to the corresponding outer fin 16.

In the case of the evaporator 1 of the present embodiment, refrigerant passes through the refrigerant inlet 7, enters the leeward upper header section 5 of the evaporator 1, and passes through all the refrigerant flow tubes 12. The refrigerant then flows out of the refrigerant outlet 8 of the windward upper header section 6.

As shown in FIGS. 3 to 6, each cool storage material container 15 is a flat, hollow container disposed such that its longitudinal direction coincides with the vertical direction, and its widthwise direction coincides with the front-rear direction. Each cool storage material container 15 is composed of a container main body portion 18 and an outward projecting portion 19. The container main body portion 18 is located rearward of the front edges of the front refrigerant flow tubes 12, and is brazed to the front and rear (two) refrigerant flow tubes 12 of each of the corresponding pairs 13. The outward projecting portion 19 is continuous with only a portion (an upper portion in the present embodiment) of the front edge (leeward edge) of the container main body portion 18, and projects forward (outward in the air-passing direction) beyond the front edges of the front refrigerant flow tubes 12. A cool storage material charging space is formed in the cool storage material container 15, excluding a peripheral edge portion thereof, such that the cool storage material charging space extends across the container main body portion 18 and the outward projecting portion 19. The outward projecting portion 19 is provided over a predetermined length as measured from the upper end of the front edge of the container main body portion 18, and the length of the outward projecting portion 19 in the vertical direction is shorter than that of the container main body portion 18. The outward projecting portion 19 of the cool storage material container 15 is located outward of the outer fins 16 with respect to the air-passing direction. A lower edge portion 19a of the outward projecting portion 19 slopes downward toward the container main body portion 18 (toward the upstream side with respect to the air-passing direction). In the present embodiment, the thickness of the container main body portion 18 as measured in the left-right direction is equal to that of the outward projecting portion 19.

First and second condensed water drain passages 21 and 22 are formed on the outer surfaces of left and right side walls 18a of the container main body portion 18 of each cool storage material container 15 such that they extend from their upper ends toward their lower ends. In the present embodiment, the entirety of each first condensed water drain passage 21 slopes such that its lower end is located on the windward side in relation to its upper end, and each of the second condensed water drain passages 22 is composed of upper and lower slope portions 22a which are formed to be separated from each other in the vertical direction and which slope such that their lower ends are located on the windward side in relation to their upper ends, and a vertical portion 22b which establishes communication between the lower end of the upper slope portion 22a and the upper end of the lower slope portion 22a. The second condensed water drain passages 22 are formed in a region extending from an upper portion to a lower portion of the container main body portion 18 so as to cover a central portion of the container main body portion 18 in the vertical direction. The upper end of each condensed water drain passage 21, 22 is open at the upper edge or the leeward edge of the container main body portion 18. The lower end of the condensed water drain passage 21 and 22 whose upper end is open at the upper edge of the container main body portion 18 is open at the windward edge of the container main body portion 18, and the lower end of the condensed water drain passage 21 and 22 whose upper end is open at the leeward edge of the container main body portion 18 is open at the lower edge of the container main body portion 18. Each condensed water drain passage 21, 22 is formed between two convex portions 23 bulging outward from each of the left and right side walls 18a of the container main body portion 18 of each cool storage material container 15. At least one of the two convex portions 23 which form a single condensed water drain passage 21, 22 has a length greater than the width of the container main body portion 18 of the cool storage material container 15 as measured in the air-passing direction. Notably, two adjacent condensed water drain passages 21, 22 share a convex portion 23 located between the two condensed water drain passages 21, 22. The bulging top walls of all the convex portions 23 are flat and are located on the same plane. The flat bulging top walls of the convex portions 23 are in contact with and are brazed to the corresponding refrigerant flow tube 12. The condensed water drain passages 21, 22 and the convex portions 23 of the left side wall 18a of the container main body portion 18 are slightly shifted, in the same horizontal plane, in the air-passing direction from those of the right side wall 18a thereof such that the condensed water drain passages 21, 22 and the convex portions 23 of the left side wall 18a of the container main body portion 18 partially overlap (i.e., do not completely overlap) with those of the right side wall 18a thereof.

A staggered inner fin 24 formed of aluminum is disposed in the container main body portion 18 of each cool storage material container 15 such that the inner fin 24 extends over substantially the entire container main body portion 18 in the vertical direction. The inner fin 24 is formed by connecting together a plurality of wavy strips 25 disposed in parallel in the vertical direction. Each of the strips 25 has crest portions 25a extending in the vertical direction, trough portions 25b extending in the vertical direction, and connection portions 25c connecting the crest portions 25a and the trough portions 25b. The strips 25 are disposed such that the crest portions 25a and the trough portions 25b of one of two wavy strips 25 located adjacent to each other in the vertical direction are positionally shifted in the front-rear direction from the crest portions 25a and the trough portions 25b of the other wavy strip 25. The inner fin 24 is brazed to the inner surfaces of the left and right side walls 18a of the container main body portion 18 of the cool storage material container 15; i.e., portions of the left and right side walls 18a of the container main body portion 18 where the convex portions 23 are not formed. The bulging top walls of the convex portions 23 are not in contact with the inner fin 24 although the bulging top walls are in contact with the refrigerant flow tubes 12. Therefore, each side wall 18a of the container main body portion 18 of each cool storage material container 15 has contact portions which are in contact with the inner fin 24 and non-contact portions which are not in contact with the inner fin 24.

The outward projecting portion 19 of each cool storage material container 15 has an expansion portion 26 which expands in the left and right directions, excluding a narrow portion thereof located on the inner side with respect to the air-passing direction (on the rear side) so that the dimension of the expansion portion 26 in the left-right direction is greater than that of the container main body portion 18. The expansion portion 26 is located outward of the outer fins 16 with respect to the air-passing direction (on the downstream side in the air-passing direction), and has flat left and right side walls 26a.

A paraffin-based latent heat storage material whose freezing is adjusted to 5° C. to 10° C. is used as a cool storage material which is charged into each cool storage material container 15. Specifically, pentadecane, tetradecane, or the like is used. Preferably, a cool storage material charging ratio (the ratio of the volume of the charged cool storage material to the volume of the internal space of the cool storage material container 15) is set to 70% to 90%. The cool storage material is charged into the cool storage material container 15 through a cool storage material charging inlet 27 which is provided in an upper end portion of the outward projecting portion 19 and is opened upward. The cool storage material charging inlet 27 is provided inside a cylindrical tubular charging member 32 which is fixed to the upper end portion of the outward projecting portion 19 and which establishes communication between the interior of the outward projecting portion 19 and the outside thereof. After the cool storage material is charged into the cool storage material container 15, the cool storage material charging inlet 27 is closed by crushing an upper portion of the charging member 32. As a result, a seal portion 28 formed as a result of closing the cool storage material charging inlet 27 is present at the upper end of the outward projecting portion 19. The seal portion 28 projects upward from the upper end of the outward projecting portion 19, and inclines (toward the leeward side in the present embodiment) in relation to an air-passing face F (a surface orthogonal to the air-passing direction; in the present embodiment, the front surface of the heat exchange core section 4) of the evaporator 1 such that the distance between the seal portion 28 and the container main body portion 18 increases upward (shown in FIG. 3).

The strength of each cool storage material container 15 is determined such that the cool storage material container 15 does not break within an ordinary use environment temperature range (e.g., within a range of −40° C. to 90° C.) even when the density of the cool storage material in the liquid phase changes and the air remaining in the cool storage material container 15 thermally expands with a resultant increase in the internal pressure.

Figure 6:
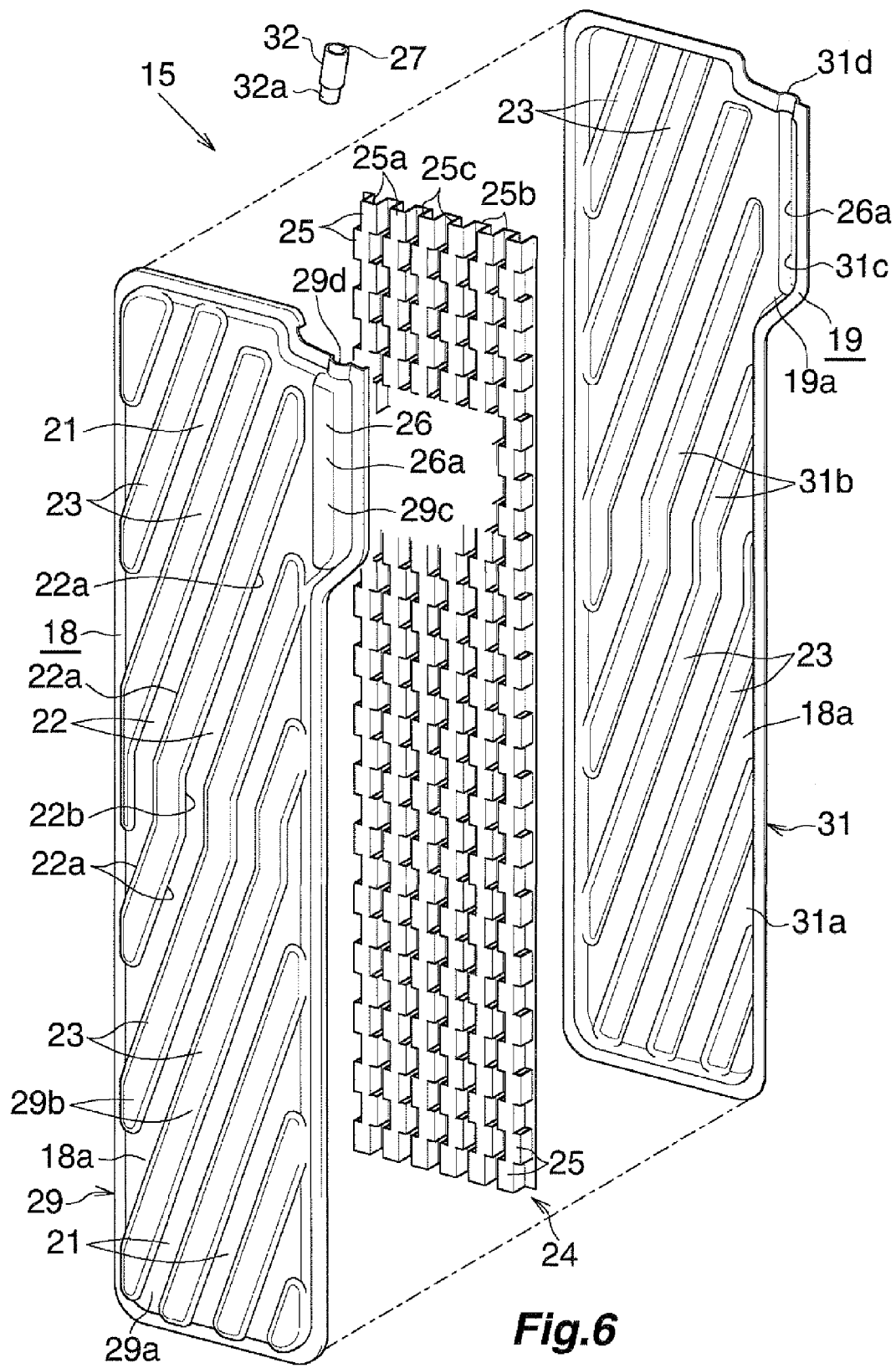
FIG. 6 is an exploded perspective view of the cool storage material container used in the evaporator with a cool storage function in FIGS. 1 and 2.

As specifically shown in FIG. 6, each cool storage material container 15 is composed of two generally rectangular aluminum plates 29 and 31 elongated in the vertical direction. Each of the aluminum plates 29 and 31 is formed by performing press work on an aluminum brazing sheet having a brazing material layer on each of opposite sides thereof. Peripheral edge portions of the aluminum plates 29 and 31 are brazed to each other. The aluminum plates 29 and 31, excluding strip-shaped peripheral edge portions thereof, are bulged outward so as to form first bulging portions 29a and 31a which become the container main body portion 18 and the outward projecting portion 19 and which have the same bulging height; second bulging portions 29b and 31b which are formed on the bulging top walls of portions of the first bulging portions 29a and 31a, the portions forming the container main body portion 18, and which are to become the convex portions 23; third bulging portions 29c and 31c which are formed on the bulging top walls of portions of the first bulging portions 29a and 31a, the portions forming the outward projecting portion 19, and which are to become the expansion portion 26; and semi-cylindrical-tubular fourth bulging portions 29d and 31d which extend upward from the upper ends of the third bulging portions 29c and 31c and which establish communication between the interiors of the third bulging portions 29c and 31c and the external space. Each of the aluminum plates 29 and 31 may be pressed by using a split die composed of upper dies for forming the first condensed water drain passages 21 located above the vertical portions 22b of the second condensed water drain passages 22, the upper slope portions 22a of the second condensed water drain passages 22, and upper portions of the vertical portions 22b of the second condensed water drain passages 22; lower dies for forming the first condensed water drain passages 21 located below the vertical portions 22b of the second condensed water drain passages 22, the lower slope portions 22a of the second condensed water drain passages 22, and lower portions of the vertical portions 22b of the second condensed water drain passages 22; and intermediate dies for forming the remaining portions of the vertical portions 22b of the second condensed water drain passages 22. Such a split die makes it possible to form aluminum plates having different heights by exchanging the intermediate dies only.

The two aluminum plates 29 and 31 are combined with the inner fin 24 interposed therebetween such that the openings of the first bulging portions 29a and 31a face each other and a small diameter portion 32a of the charging member 32 provided at the lower end thereof is sandwiched between the fourth bulging portions 29d and 31d. In this state, the peripheral edge portions of the two aluminum plates 29 and 31 are brazed together, and the two aluminum plates 29 and 31 and the charging member 32 are brazed together, whereby the cool storage material container 15 is formed. The cool storage material is charged into the cool storage material container 15 through the cool storage material charging inlet 27 inside the charging member 32 whose upper portion has not yet been crushed. The cool storage material charging inlet 27 is closed by crushing the upper portion of the charging member 32, whereby the seal portion 28 is formed. The cool storage material charged into the cool storage material container 15 through the cool storage material charging inlet 27 first enters the outward projecting portion 19, and then enters the container main body portion 18. Since the lower edge portion 19a of the outward projecting portion 19 slopes downward toward the container main body portion 18, the cool storage material charged into the outward projecting portion 19 of the cool storage material container 15 through the cool storage material charging inlet 27 flows into the container main body portion 18 more easily.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front refrigerant flow tubes 12, and flows out from the refrigerant outlet 8 of the windward upper header section 6. When the refrigerant flows through the refrigerant flow tubes 12, the refrigerant performs heat exchange with air passing through the clearances 14, and flows out in a vapor phase.

When the compressor is operating, the cool carried by the refrigerant flowing through the refrigerant flow tubes 12 is transferred directly to the cool storage material within each cool storage material container 15 from the bulging top walls of the convex portions 23 of the left and right side walls 18a of the container main body portion 18 of the cool storage material container 15, the bulging top walls being brazed to the corresponding refrigerant flow tubes 12. Also, the cool is transferred from the bulging top walls of the convex portions 23 to the entire cool storage material within the cool storage material container 15 through the inner fin 24 and portions of the left and right side walls 18a, which portions are not brazed to the refrigerant flow tubes 12. Thus, the cool is stored in the cool storage material.

At that time, condensed water produced on the surface of each cool storage material container 15 enters the condensed water drain passages 21 and 22, and, due to surface tension, accumulates within the condensed water drain passages 21 and 22, along the convex portions 23 on the opposite sides of the condensed water drain passages 21 and 22. When the amount of the condensed water accumulated within the condensed water drain passages 21 and 22 increases, the gravitational force acting on the accumulated, condensed water becomes greater than the surface tension, and the accumulated, condensed water flows downward at once through the condensed water drain passages 21 and 22. Accordingly, the time over which the condensed water remains in the condensed water drain passages 21 and 22 becomes shorter, and the condensed water produced on the outer surface of each cool storage material container 15 can be drained smoothly.

When the compressor stops, the cool stored in the cool storage material within each cool storage material container 15 is transferred directly to the refrigerant flow tubes 12 from the bulging top walls of the convex portions 23 of the left and right side walls 18a of the container main body portion 18 of the cool storage material container 15, the bulging top walls being brazed to the corresponding refrigerant flow tubes 12. The stored cool is also transferred from the inner fin 24 to the refrigerant flow tubes 12 through the portions of the left and right side walls 18a, which portions are not brazed to the refrigerant flow tubes 12, and the bulging top walls of the convex portions 23. The cool then passes through the refrigerant flow tubes 12 and propagates to the outer fins 16 brazed to the sides of the refrigerant flow tubes 12 opposite the cool storage material container 15. Subsequently, the cool is transferred via the outer fins 16 to air passing through the clearances 14 adjacently located on the opposite sides of the clearance 14 in which the cool storage material container 15 is disposed. Accordingly, even when the temperature of air having passed through the evaporator 1 increases, the air is cooled, so that a sharp drop in the cooling capacity can be prevented.

Figure 7:
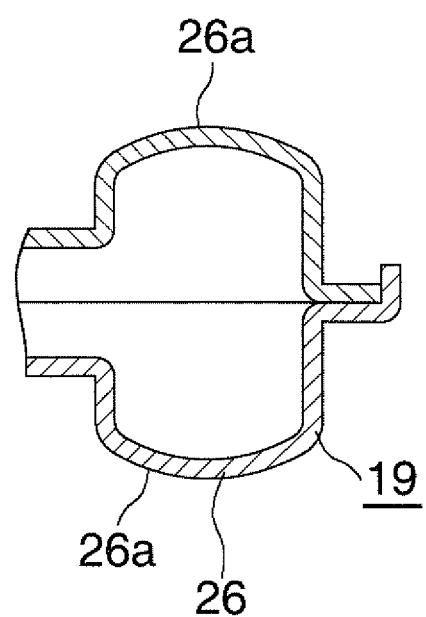
FIG. 7 is a view corresponding to a portion of FIG. 4 and showing a state in which the internal pressure of the cool storage material container used in the evaporator with a cool storage function in FIGS. 1 and 2 has increased abnormally.

When the ambient temperature becomes higher than the ordinary use environment temperature range (for example, becomes 100° C.), the change in the density of the cool storage material in the liquid phase and the thermal expansion of air remaining in the cool storage material container 15 become remarkable, and the internal pressure of the cool storage material container 15 increases abnormally. However, in this case, as shown in FIG. 7, the left and right side walls 26a of the expansion portion 26 provided on the outward projecting portion 19 of the cool storage material container 15 deform to expand outward, whereby breakage of the cool storage material container 15 due to an increase in the internal pressure is prevented. In addition, since the strength of the outward projecting portion 19 projecting toward the leeward side in relation to the outer fins 16 is lower than the strength of the container main body portion 18 brazed to the refrigerant flow tubes 12, when the ambient temperature increases further, the cool storage material container 15 may break at the outward projecting portion 19 with resultant leakage of the cool storage material. However, since the refrigerant flow tubes 12 are not affected by the breakage of the cool storage material container 15, breakage of the refrigerant flow tubes 12 is prevented. In addition, since leakage of the cool storage material occurs at a fixed (same) position, measures against the leaked cool storage material can be taken relatively simply.

Figure 8:
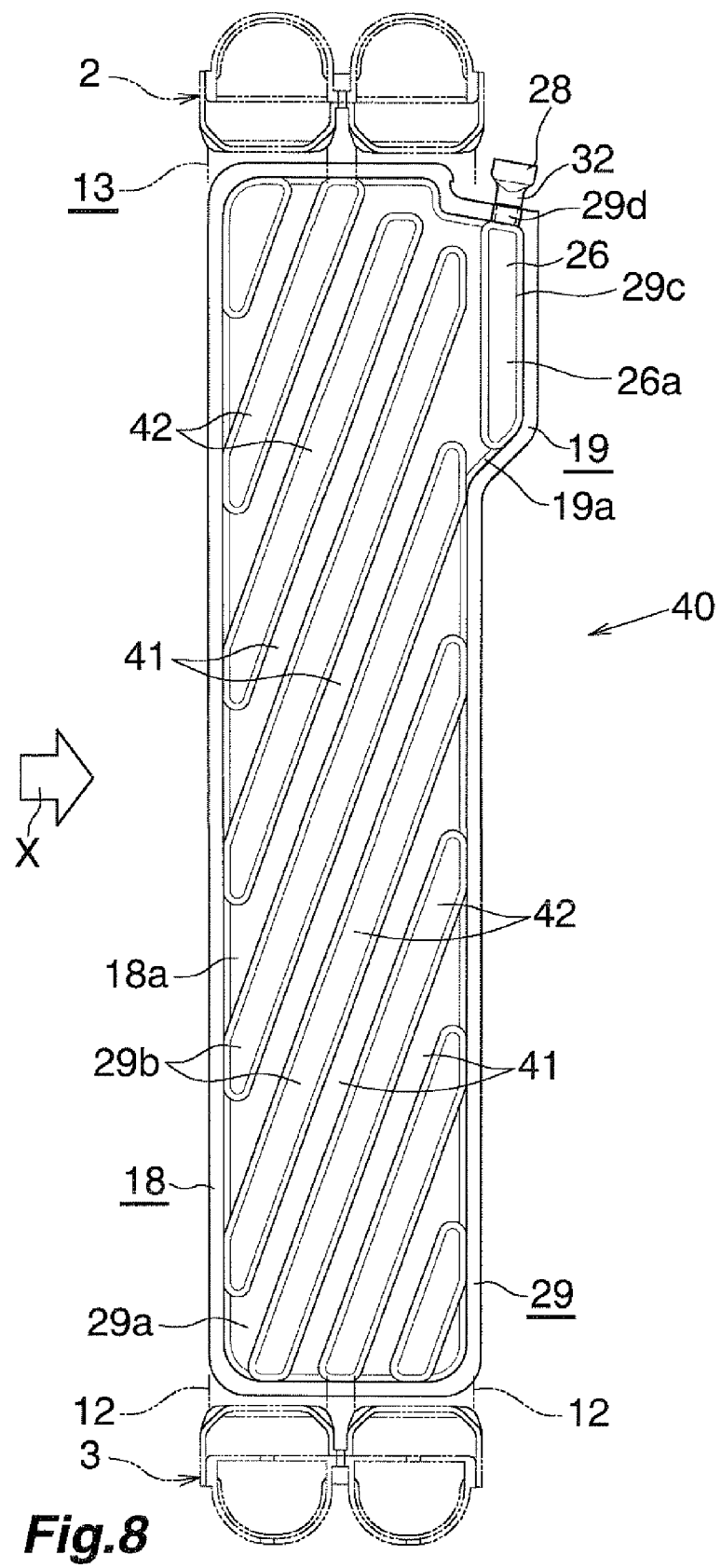
FIG. 8 is a view corresponding to FIG. 3 and showing a modification of the cool storage material container used in the evaporator with a cool storage function in FIGS. 1 and 2.

FIG. 8 shows a modification of the cool storage material container used in the evaporator with a cool storage function according to the embodiment of the present invention.

In the case of a cool storage material container 40 shown in FIG. 8, a plurality of condensed water drain passages 41 are formed on the outer surface of each of the left and right side walls 18a of the container main body portion 18 such that the condensed water drain passages 41 are spaced from one another and extend from their upper ends toward their lower ends. The entirety of each condensed water drain passage 41 slopes such that its lower end is located on the windward side in relation to its upper end. The upper end of each condensed water drain passage 41 is open at the upper edge or the leeward edge of the container main body portion 18. The lower end of the condensed water drain passage 41 whose upper end is open at the upper edge of the container main body portion 18 is open at the windward edge of the container main body portion 18, and the lower end of the condensed water drain passage 41 whose upper end is open at the leeward edge of the container main body portion 18 is open at the lower edge of the container main body portion 18. Each condensed water drain passage 41 is formed between two convex portions 42 bulging outward from each of the left and right walls 18a of the container main body portion 18 of each cool storage material container 15. At least one of the two convex portions 42 which form a single condensed water drain passage 41 has a length greater than the width of the container main body portion 18 of the cool storage material container 15 as measured in the air-passing direction. Notably, two adjacent condensed water drain passages 41 share a convex portion 42 located between the two condensed water drain passages 41. The bulging top walls of all the convex portions 42 are flat and are located on the same plane. The flat bulging top walls of the convex portions 42 are in contact with and are brazed to the corresponding refrigerant flow tube 12. Although not illustrated, the condensed water drain passages 41 and the convex portions 42 of the left side wall 18a of the container main body portion 18 are slightly shifted, in the same horizontal plane, in the air-passing direction from those of the right side wall 18a thereof such that the condensed water drain passages 41 and the convex portions 42 of the left side wall 18a of the container main body portion 18 partially overlap (i.e., do not completely overlap) with those of the right side wall 18a thereof.

The structure of the remaining portion is the same as that of the above-described cool storage material container 15, and like portions are denoted by like reference numerals. Notably, the cool storage material container 40 is also composed of two generally rectangular aluminum plates 29 and 31 each of which is formed by performing press work on an aluminum brazing sheet having a brazing material layer on each of opposite sides thereof, and whose strip-shaped peripheral edge portions are brazed to each other. The aluminum plates 29 and 31 have first bulging portions 29a and 31a which form the container main body portion 18 and the outward projecting portion 19 and which have the same bulging height; second bulging portions 29b and 31b which are formed on the bulging top walls of portions of the first bulging portions 29a and 31a, the portions forming the container main body portion 18, and which are to become the convex portions 42; third bulging portions 29c and 31c which are formed on the bulging top walls of portions of the first bulging portions 29a and 31a, the portions forming the outward projecting portion 19, and which are to become the expansion portion 26; and semi-cylindrical-tubular fourth bulging portions 29d and 31d which extend upward from the upper ends of the third bulging portions 29c and 31c and which establish communication between the interiors of the third bulging portions 29c and 31c and a space on the upper side.

1) An evaporator with a cool storage function comprising a plurality of flat refrigerant flow tubes disposed in parallel such that their longitudinal direction coincides with a vertical direction, their width direction coincides with an air-passing direction, and they are spaced from one another in a left-right direction corresponding to a thickness direction of the refrigerant flow tubes, clearances being formed such that each clearance is provided between adjacent refrigerant flow tubes; a cool storage material container containing a cool storage material and disposed in at least two of the clearances, the cool storage material container having a container main body portion joined to the corresponding refrigerant flow tubes; and outer fins disposed in the remaining clearances and joined to the refrigerant flow tubes, wherein a plurality of condensed water drain passages are formed on an outer surface of each of left and right side walls of the container main body portion such that each of the condensed water drain passages slopes from an upper end toward a lower end thereof and is open at the upper and lower ends; each condensed water drain passage is formed between two convex portions bulging outward from the left or right side wall of the container main body portion of the cool storage material container; and at least one of two convex portions which form one condensed water drain passage has a length greater than a width of the container main body portion of the cool storage material container as measured in the air-passing direction.

2) An evaporator with a cool storage function according to par. 1), wherein projecting ends of the convex portions of the container main body portion of the cool storage material container are joined to the corresponding refrigerant flow tubes; an inner fin is disposed in the container main body portion of the cool storage material container and is joined to portions of the left and right side walls of the container main body portion, which portions form bottom portions of the condensed water drain passages; and the condensed water drain passages and the convex portions of the left side wall of the container main body portion are slightly shifted, in the same horizontal plane, in the air-passing direction from those of the right side wall of the container main body portion such that the condensed water drain passages and the convex portions of the left side wall of the container main body portion do not completely overlap with those of the right side wall of the container main body portion.

3) An evaporator with a cool storage function according to par. 1), wherein, of all the condensed water drain passages formed on the outer surfaces of the left and right side walls of the container main body portion of the cool storage material container, some condensed water drain passages are formed such that the entirety of each condensed water drain passage slopes such that its lower end is located on the windward side in relation to its upper end, and each of the remaining condensed water drain passages is composed of upper and lower slope portions which are formed to be separated from each other in the vertical direction and which slope such that their lower ends are located on the windward side in relation to their upper ends, and a vertical portion which establishes communication between the lower end of the upper slope portion and the upper end of the lower slope portion.

4) An evaporator with a cool storage function according to par. 1), wherein all the condensed water drain passages formed on the outer surfaces of the left and right side walls of the container main body portion of the cool storage material container are formed such that the entirety of each condensed water drain passage slopes such that its lower end is located on the windward side in relation to its upper end.

5) An evaporator with a cool storage function according to par. 3), wherein the upper end of each condensed water drain passage is open at an upper edge or a leeward edge of the container main body portion, the lower end of the condensed water drain passage whose upper end is open at the upper edge of the container main body portion is open at a windward edge of the container main body portion, and the lower end of the condensed water drain passage whose upper end is open at the leeward edge of the container main body portion is open at a lower edge of the container main body portion.

6) An evaporator with a cool storage function according to par. 4), wherein the upper end of each condensed water drain passage is open at an upper edge or a leeward edge of the container main body portion, the lower end of the condensed water drain passage whose upper end is open at the upper edge of the container main body portion is open at a windward edge of the container main body portion, and the lower end of the condensed water drain passage whose upper end is open at the leeward edge of the container main body portion is open at a lower edge of the container main body portion.

7) An evaporator with a cool storage function according to par. 1), wherein the cool storage material container has an outward projecting portion which is provided such that the outward projecting portion is continuous with a leeward edge or windward edge of the container main body portion and projects beyond the refrigerant flow tubes in the air-passing direction; the outward projecting portion of the cool storage material container has an expansion portion which expands in relation to the container main body portion in at least one of leftward and rightward directions and whose dimension in the left-right direction is greater than that of the container main body portion; the expansion portion is located outward of the fins in the air-passing direction; and at least one of left and right side walls of the expansion portion is flat.

8) An evaporator with a cool storage function according to par. 7), wherein the outward projecting portion of the cool storage material container has a predetermined length as measured from an upper end of the leeward edge or windward edge of the container main body portion, and is provided such that the outward projecting portion is continuous with of the leeward edge or windward edge of the container main body portion over only a portion of the enter length of the leeward edge or windward edge in the vertical direction, and projects beyond the refrigerant flow tubes in the air-passing direction.

9) An evaporator with a cool storage function according to par. 8), wherein a lower edge portion of the outward projecting portion slopes downward toward the container main body portion.

10) An evaporator with a cool storage function according to par. 7), wherein the outward projecting portion of the cool storage material container has a seal portion formed by closing a cool storage material charging inlet used to charge a cool storage material into the cool storage material container.

11) An evaporator with a cool storage function according to par. 10), wherein the seal portion projects upward from an upper end of the outward projecting portion, and the seal portion inclines in relation to an air-passing face such that a distance between the seal portion and the container main body portion increases upward.

12) An evaporator with a cool storage function according to par. 1), wherein a plurality of tube sets each including a plurality of flat refrigerant flow tubes disposed such that their longitudinal direction coincides with the vertical direction, their width direction coincides with the air-passing direction, and they are spaced from one another in the air-passing direction are disposed such that the tube sets are spaced from one another in the thickness direction of the refrigerant flow tubes, and a clearance is formed between adjacent tube sets.

13) An evaporator with a cool storage function according to par. 1), wherein the outer fin is disposed in each of clearances adjacently located on the left and right sides of the clearance in which the cool storage material container is disposed.

According to the evaporator with a cool storage function of any one of pars. 1) to 13), a plurality of condensed water drain passages are formed on an outer surface of each of left and right side walls of the container main body portion such that each of the condensed water drain passages slopes from an upper end toward a lower end thereof and is open at the upper and lower ends; each condensed water drain passage is formed between two convex portions bulging outward from the left or right side wall of the container main body portion of the cool storage material container; and at least one of two convex portions which form one condensed water drain passage has a length greater than a width of the container main body portion of the cool storage material container as measured in the air-passing direction. Condensed water produced on the surface of the container main body of the cool storage material container may accumulate, due to surface tension, within each condensed water drain passage, along the two convex portions on the opposite sides of the condensed water drain passage. In such a case, when the amount of the condensed water accumulated within the condensed water drain passage increases, the gravitational force acting on the accumulated, condensed water becomes greater than the surface tension, and the accumulated, condensed water flows downward at once through the condensed water drain passage. Accordingly, the time over which the condensed water remains in the condensed water drain passages becomes shorter, and the condensed water produced on the outer surface of each cool storage material container can be drained smoothly.

According to the evaporator with a cool storage function of par. 2), projecting ends of the convex portions of the container main body portion of the cool storage material container are joined to the corresponding refrigerant flow tubes; an inner fin is disposed in the container main body portion of the cool storage material container and is joined to portions of the left and right side walls of the container main body portion, which portions form bottom portions of the condensed water drain passages; and the condensed water drain passages and the convex portions of the left side wall of the container main body portion are slightly shifted, in the same horizontal plane, in the air-passing direction from those of the right side wall of the container main body portion such that the condensed water drain passages and the convex portions of the left side wall of the container main body portion do not completely overlap with those of the right side wall of the container main body portion. Therefore, through proper adjustment of the widths of the condensed water drain passages and the convex portions as measured in the air-passing direction and the shift amount in the air-passing direction, it becomes possible to form the left and right side walls of the container main body portion of the cool storage material container such that each side wall has contact portions which are in contact with the inner fin and non-contact portions which are not in contact with the inner fin, and to make the total area of the contact portions of each side wall greater than that of the non-contact portions of the corresponding side wall in an overlap region where the left and right side walls of the container main body overlap with the refrigerant flow tubes when the cool storage material container is viewed from the left or right side thereof. By making the total area of the contact portions of each side wall greater than that of the non-contact portions of the opposite corresponding side wall, the greater total area of contact portions allows for more uniform heat transmission to the cool storage material throughout the cool storage material container via the inner fin. Therefore, excellent heat transmission between the left and right side walls of the cool storage material container and the cool storage material via the inner fin is attained at both of the time of storing cool and the time of releasing cool.

According to the evaporator with a cool storage function of par. 3), 4), 5), or 6), condensed water can be held at the lower portions of the condensed water drain passages of the cool storage material container when air is passing through the evaporator. Therefore, an increase in the temperature of air passing between the refrigerant flow tubes and the cool storage material container can be decreased by the cool (sensible heat) of the condensed water at the time of cooling (the time of storing cool) and at the time of releasing cool.

According to the evaporator with a cool storage function of par. 7), when the internal pressure of the cool storage material container increases abnormally, the flat side wall of the left and right side walls of the expansion portion of the outward projecting portion deform to expand outward, whereby breakage of the cool storage material container due to an abnormal increase in the internal pressure of the cool storage material container is prevented.

According to the evaporator with a cool storage function of par. 8), the outward projecting portion of the cool storage material container has a predetermined length as measured from an upper end of the leeward edge or windward edge of the container main body portion, and is provided such that the outward projecting portion is continuous with of the leeward edge or windward edge of the container main body portion over only a portion of the enter length of the leeward edge or windward edge in the vertical direction, and projects beyond the refrigerant flow tubes in the air-passing direction. Therefore, the amount of the cool storage material present in the outward projecting portion which is not in direct contact with the refrigerant flow tubes can be reduced, whereby a portion of all the cool storage material charged into the cool storage material container, which portion is not cooled effectively, can be reduced in amount. Namely, the strength of the cool storage material container and the cool storage material charging ratio (the ratio of the volume of the charged cool storage material to the volume of the internal space of the cool storage material container) are designed such that the cool storage material container does not break within the ordinary use environment temperature rang (e.g., within a range of −40° C. to 90° C.) even when the density of the cool storage material in the liquid phase changes and the air remaining in the cool storage material container thermally expands with a resultant increases in the internal pressure. Since such a cool storage material charging ratio is of course less than 100%, a space which is not occupied by the cool storage material is present near the upper end of the cool storage material container. Therefore, the entire interior of the outward projecting portion provided over a predetermined length from the upper end of the leeward edge or windward edge of the container main body portion does not contain the cool storage material. As a result, the amount of the cool storage material not cooled effectively (of all the cool storage material charged into the cool storage material container) can be reduced.

According to the evaporator with a cool storage function of par. 9), when the cool storage material is charged into the cool storage material container, for example, through a cool storage material charging inlet provided on the outward projecting portion as described in par. 10), the cool storage material easily flows into the container main body portion. Therefore, the cool storage material can be changed into cool storage material container quickly.

According to the evaporator with a cool storage function of par. 11), the operation of charging the cool storage material into the cool storage material container through the cool storage material charging inlet and the operation of closing the cool storage material charging inlet are facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. An evaporator with a cool storage function, the evaporator comprising:
   a plurality of flat refrigerant flow tubes having a longitudinal direction and a width direction which is perpendicular to the longitudinal direction, the plurality of flat refrigerant flow tubes is configured such that air is to pass in a direction parallel to the width direction, the plurality of flat refrigerant flow tubes being disposed in parallel and spaced apart from one another in a thickness direction of the plurality of refrigerant flow tubes to form spaces among the plurality of flat refrigerant flow tubes, the thickness direction being perpendicular to the longitudinal direction and the width direction;
   outer fins disposed in a first part of the spaces and joined to the plurality of refrigerant flow tubes; and
   at least one cool storage material container containing a cool storage material and disposed in a second part of the spaces other than the first part, the at least one cool storage material container comprising:
a container main body having a first wall and a second wall opposite to the first wall which are substantially parallel to a plane including the longitudinal direction and the width direction, the first wall and the second wall being connected to adjacent refrigerant flow tubes among the plurality of refrigerant flow tubes, respectively;
condensed water drain passages provided on outer surfaces of the first wall and the second wall; and
a plurality of convex portions provided on the first wall and the second wall to protrude outwardly from the first wall and the second wall, two adjacent convex portions among the plurality of convex portions forming each of the condensed water drain passages therebetween, the condensed water drain passage extending in an extending direction from a first end of the condensed water drain passage to a second end of the condensed water drain passage obliquely with respect to the longitudinal direction, at least one of the two adjacent convex portions having a length in the extending direction greater than a width of the container main body in the width direction,
wherein the condensed water drain passages and the convex portions of the first wall are shifted in the width direction from the condensed water drain passages and the convex portions of the second side wall such that the condensed water drain passages and the convex portions of the first wall of the container main body do not entirely overlap with the condensed water drain passages and the convex portions of the second wall when viewed in a direction parallel to the thickness direction.

2. The evaporator with a cool storage function according to claim 1,
wherein projecting ends of the convex portions of the container main body of the cool storage material container are joined to the adjacent refrigerant flow tubes, wherein an inner fin is disposed in the container main body of the cool storage material container and contacts inner surfaces of portions of the first wall and the second wall, the portions of the first wall and the second wall corresponding to bottom portions of the condensed water drain passages.

3. The evaporator with a cool storage function according to claim 1, wherein, of all the condensed water drain passages formed on the first wall and the second wall of the container main body of the cool storage material container, some condensed water drain passages are formed such that a entirety of each condensed water drain passage slopes such that its lower end is located on a windward side in relation to its upper end, and each of the remaining condensed water drain passages is composed of upper and lower slope portions which are formed to be separated from each other in the vertical direction and which slope such that their lower ends are located on the windward side in relation to their upper ends, and a vertical portion which establishes communication between the lower end of the upper slope portion and the upper end of the lower slope portion.

4. The evaporator with a cool storage function according to claim 3, wherein the upper end of each condensed water drain passage is open at an upper edge or a leeward edge of the container main body, the lower end of the condensed water drain passage whose upper end is open at the upper edge of the container main body is open at a windward edge of the container main body, and the lower end of the condensed water drain passage whose upper end is open at the leeward edge of the container main body is open at a lower edge of the container main body.

5. The evaporator with a cool storage function according to claim 1, wherein all the condensed water drain passages formed on the first wall and the second wall of the container main body of the cool storage material container are formed such that the entirety of each condensed water drain passage slopes such that its lower end is located on the windward side in relation to its upper end.

6. The evaporator with a cool storage function according to claim 5, wherein the upper end of each condensed water drain passage is open at an upper edge or a leeward edge of the container main body, the lower end of the condensed water drain passage whose upper end is open at the upper edge of the container main body is open at a windward edge of the container main body, and the lower end of the condensed water drain passage whose upper end is open at the leeward edge of the container main body is open at a lower edge of the container main body.

7. The evaporator with a cool storage function according to claim 1, wherein the cool storage material container has an outward projecting portion which is provided such that the outward projecting portion is continuous with a leeward edge or windward edge of the container main body and projects beyond the refrigerant flow tubes in the air-passing direction; the outward projecting portion of the cool storage material container has an expansion portion which expands in relation to the container main body in at least one of leftward and rightward directions and whose dimension in the left-right direction is greater than that of the container main body; the expansion portion is located outward of the fins in the air-passing direction; and at least one of left and right side walls of the expansion portion is flat.

8. The evaporator with a cool storage function according to claim 7, wherein the outward projecting portion of the cool storage material container has a predetermined length as measured from an upper end of the leeward edge or windward edge of the container main body, and is provided such that the outward projecting portion is continuous with of the leeward edge or windward edge of the container main body over only a portion of the enter length of the leeward edge or windward edge in the vertical direction, and projects beyond the refrigerant flow tubes in the air-passing direction.

9. The evaporator with a cool storage function according to claim 8, wherein a lower edge portion of the outward projecting portion slopes downward toward the container main body.

10. The evaporator with a cool storage function according to claim 7, wherein the outward projecting portion of the cool storage material container has a seal portion formed by closing a cool storage material charging inlet used to charge a cool storage material into the cool storage material container.

11. The evaporator with a cool storage function according to claim 10, wherein the seal portion projects upward from an upper end of the outward projecting portion, and the seal portion inclines in relation to an air-passing face such that a distance between the seal portion and the container main body increases upward.

12. The evaporator with a cool storage function according to claim 7,
wherein the outward projecting portion of the cool storage material container has a seal portion formed by closing a cool storage material charging inlet used to charge a cool storage material into the cool storage material container, and wherein the cool storage material charging inlet extends in a direction that is inclined in relation to a direction parallel to the width direction.

13. The evaporator with a cool storage function according to claim 7,
wherein the outward projecting portion of the cool storage material container has a seal portion formed by closing a cool storage material charging inlet used to charge a cool storage material into the cool storage material container, and
wherein the cool storage material charging inlet extends in a direction that is inclined in relation to a direction parallel to the longitudinal direction.

14. The evaporator with a cool storage function according to claim 7, wherein each cool storage material container has a separate cool storage material charging inlet on the outward projecting portion thereof, the separate cool storage material charging inlet being used to charge a cool storage material therein.

15. The evaporator with a cool storage function according to claim 1, wherein a plurality of tube sets each including a plurality of flat refrigerant flow tubes disposed such that their longitudinal direction coincides with the vertical direction, their width direction coincides with the air-passing direction, and they are spaced from one another in the air-passing direction are disposed such that the tube sets are spaced from one another in the thickness direction of the refrigerant flow tubes, and a clearance is formed between adjacent tube sets.

16. The evaporator with a cool storage function according to claim 1, wherein the outer fin is disposed in each of clearances adjacently located on the left and right sides of the clearance in which the cool storage material container is disposed.

17. The evaporator with a cool storage function according to claim 1,
wherein the cool storage material container has an outward projecting portion which is provided such that the outward projecting portion is continuous with a leeward edge or windward edge of the container main body and projects beyond the refrigerant flow tubes in the air-passing direction, and
wherein the outward projecting portion of the cool storage material container has an expansion portion that longitudinally extends in a direction parallel to the longitudinal direction.

18. The evaporator with a cool storage function according to claim 17, wherein each cool storage material container has a separate cool storage material charging inlet on the outward projecting portion thereof, the separate cool storage material charging inlet being used to charge a cool storage material therein.

* * * * *